United States Patent [19]

Nakagawa

[11] Patent Number: 5,426,762

[45] Date of Patent: * Jun. 20, 1995

[54] SYSTEM FOR DETERMINING A TRUTH OF SOFTWARE IN AN INFORMATION PROCESSING APPARATUS

[75] Inventor: Katsuya Nakagawa, Kusatsu, Japan

[73] Assignee: Nintendo Co., Ltd., Kyoto, Japan

[ * ] Notice: The portion of the term of this patent subsequent to Jan. 24, 2006 has been disclaimed.

[21] Appl. No.: 43,745

[22] Filed: Apr. 7, 1993

Related U.S. Application Data

[60] Continuation of Ser. No. 735,313, Jul. 24, 1991, abandoned, which is a division of Ser. No. 297,105, Jan. 13, 1989, Pat. No. 5,070,479, which is a division of Ser. No. 812,929, Dec. 23, 1985, Pat. No. 4,799,635.

[30] Foreign Application Priority Data

Jun. 24, 1985 [JP] Japan .................... 60-138699
Jun. 28, 1985 [JP] Japan .................... 60-143026

[51] Int. Cl.6 ............................................ G06F 12/00
[52] U.S. Cl. ....................................... 395/425; 380/3; 364/DIG. 2; 364/940; 364/918.7
[58] Field of Search ............... 380/3, 4, 5; 235/380, 235/382, 426, 436; 395/400, 425

[56] References Cited

U.S. PATENT DOCUMENTS

| | | |
|---|---|---|
| 3,755,641 | 8/1973 | Rackman . |
| 3,772,662 | 11/1973 | Blair . |
| 3,818,190 | 6/1974 | Silverman et al. . |
| 3,839,736 | 10/1974 | Hoshall . |
| 3,859,634 | 1/1975 | Perron et al. . |
| 3,934,122 | 1/1976 | Riccitelli . |
| 4,095,791 | 6/1978 | Smith et al. . |
| 4,117,605 | 10/1978 | Kurland et al. . |
| 4,120,030 | 10/1978 | Johnstone . |
| 4,149,027 | 4/1979 | Asher et al. . |

(List continued on next page.)

FOREIGN PATENT DOCUMENTS 0114522 1/1984 European Pat. Off. .
53-17849 6/1978 Japan .

OTHER PUBLICATIONS

Rockwell International Document No. 29650 N30, Rev. 1, "R6500 Microcomputer System Programming Manual," Feb. 1979.

Steve Ciarcia, "Build Your Own Z80 Computer," Byte Books, 1981.

FAMICOM schematic diagram.

U.S. Department of Commerce, FIPS PUB 46, "Data Encryption Standard," Jan. 15, 1977.

*Primary Examiner*—Rebecca L. Rudolph
*Attorney, Agent, or Firm*—Nixon & Vanderhye

[57] ABSTRACT

An external memory cartridge for replaceable connection with a video game main unit contains a security device that prevents unauthorized memory cartridges from playing on the game main unit. The video game main unit connects to a television receiver, and includes at least one video graphics processing arrangement that controls the television receiver to display a changing picture defined by video game software contained in the external memory cartridge. The external memory cartridge has a cartridge housing that contains a video game memory device and a security device. The video game memory device contains video game software. An electrical connector couples the video game memory device with said video game main unit to permit the video game main unit to access and execute the video game software. The security device includes at least one input terminal and at least one output terminal connected to said electrical connector. The security device may comprise a microprocessor that performs a stored security program. It receives input signals from its electrical connector on the input terminal and generates, on its output terminal, results based on said received input signals and the stored security program.

58 Claims, 10 Drawing Sheets

U.S. PATENT DOCUMENTS

| | | |
|---|---|---|
| 4,193,131 | 3/1980 | Lennon et al. . |
| 4,218,582 | 8/1980 | Hellman et al. . |
| 4,218,738 | 8/1980 | Matyas et al. . |
| 4,268,715 | 5/1981 | Atalla . |
| 4,281,215 | 7/1981 | Atalla . |
| 4,295,039 | 10/1981 | Stuckert . |
| 4,310,720 | 1/1982 | Check, Jr. . |
| 4,352,492 | 10/1982 | Smith . |
| 4,384,326 | 5/1983 | Devchoudhury . |
| 4,386,773 | 6/1983 | Bronstein . |
| 4,430,728 | 2/1984 | Beitel et al. . |
| 4,432,067 | 2/1984 | Nielsen . |
| 4,442,486 | 4/1984 | Mayer . |
| 4,446,519 | 5/1984 | Thomas . |
| 4,454,594 | 6/1984 | Heffron et al. . |
| 4,458,315 | 7/1984 | Uchenick . |
| 4,459,655 | 7/1984 | Willemin . |
| 4,462,076 | 7/1984 | Smith, III . |
| 4,471,163 | 9/1984 | Donald et al. . |
| 4,471,216 | 9/1984 | Herve . |
| 4,492,582 | 1/1985 | Chang et al. . |
| 4,497,038 | 1/1985 | Diepold-Scharnitzky . |
| 4,500,879 | 2/1985 | Smith, III et al. . |
| 4,523,297 | 6/1985 | Ugon et al. . |
| 4,562,306 | 12/1985 | Chou et al. . |
| 4,575,622 | 3/1986 | Pellegrini . |
| 4,602,351 | 7/1986 | Shimamura et al. . |
| 4,652,990 | 3/1987 | Pailen et al. ............... 380/4 |
| 4,670,857 | 6/1987 | Rackman . |
| 4,680,731 | 7/1987 | Izumi et al. . |
| 4,683,553 | 7/1987 | Mollier . |
| 4,723,121 | 2/1988 | van den Boom et al. . |
| 4,736,419 | 4/1988 | Roe ............................ 380/3 |
| 4,755,799 | 7/1988 | Romano . |
| 4,757,468 | 7/1988 | Domenik et al. ........... 380/4 |
| 4,862,156 | 8/1989 | Westberg et al. . |
| 4,879,645 | 11/1989 | Tamado et al. .......... 235/380 |

34 KEY DEVICE

SYSTEM FOR DETERMINING A TRUTH OF SOFTWARE IN AN INFORMATION PROCESSING APPARATUS

This is a continuation of application Ser. No. 07/735,313, filed 24 Jul. 1991 now abandoned; which is a division of application Ser. No. 07/297,105, filed 13 Jan. 1989, now U.S. Pat No. 5,070,479; which is a division of application Ser. No. 06/812,929, filed 23 Dec. 1985, now U.S. Pat. No. 4,799,635.

BACKGROUND OF THE INVENTION

1. Field of the Invention

The present invention relates to a system for determining authenticity of software in an information processing apparatus. More specifically, the present invention relates to a system for determining whether software contained in an external memory, for example, ROM cartridge, floppy disk or the like, is authorized for use with a main processor unit.

2. Description of the Prior Art

Conventionally, such information processing apparatus are known wherein an external memory is loaded in a main processor unit and the main unit executes a predetermined program according to software contained in this external memory. One example of such a data processing apparatus is the "Nintendo Entertainment System (trade mark)" manufactured and sold by the assignee of the present application. In that system, a ROM cartridge (external memory) is loaded into the main processor unit, the main unit is connected to a television receiver, and thereby various games can be enjoyed on the screen of the television receiver. A large number of software programs (ROM cartridges) are available for use in such information processing apparatus. However, such authentic software programs are subject to being imitated and counterfeited and it is desirable to provide a system that enables data processing of only authentic program cartridges.

SUMMARY OF THE INVENTION

Therefore, a principal object of the present invention is to provide a system capable of determining authenticity of software contained in an external memory which is employed together with a main unit in an information processing apparatus. As used herein, authentic means that the software is genuine and authorized for use in the information processing apparatus.

Another object of the present invention is to provide a system for both determining authenticity of software contained in an external memory in an information processing apparatus and enabling data processing in accordance with such software only when it has been determined to be authentic.

An information processing apparatus in which the present invention may be used comprises a main processor unit and an external memory removably connected to this main unit, and wherein the external memory comprises a program (software) for operating the main unit. Associated with external memory is an active device for determining authenticity of the software, and this active device functions as a key device. Another active device is installed in the main unit, and this second active device functions as a lock device. By cooperation of the key device and the lock device, the information processing apparatus is enabled or disabled depending on the authenticity of the external memory which is installed in the main unit, and, if enabled, the apparatus executes a predetermined information processing program according to software contained in the external memory.

In accordance with the present invention, the main processor unit is not enabled unless an authentic external memory (software) is loaded, and therefore the use of a false (not authentic) external memory can be excluded effectively.

In a preferred embodiment in accordance with the present invention, duplicate semiconductor digital processing devices are used as the key device and the lock device. The two digital devices each execute a predetermined data processing program in synchronism. Then, the lock digital processing device compares the result of its processing with the result of the synchronous processing by the key device. In accordance with this preferred embodiment, the authenticity of the software of the external memory can be determined reliably by a simple arrangement of duplicate digital processing devices added to the main unit and the external memory, respectively.

These objects and other objects, features, aspects and advantages of the present invention will become more apparent from the following detailed description of the embodiments of the present invention when taken in conjunction with accompanying drawings.

DESCRIPTION OF THE PREFERRED EMBODIMENTS

Figure 1:
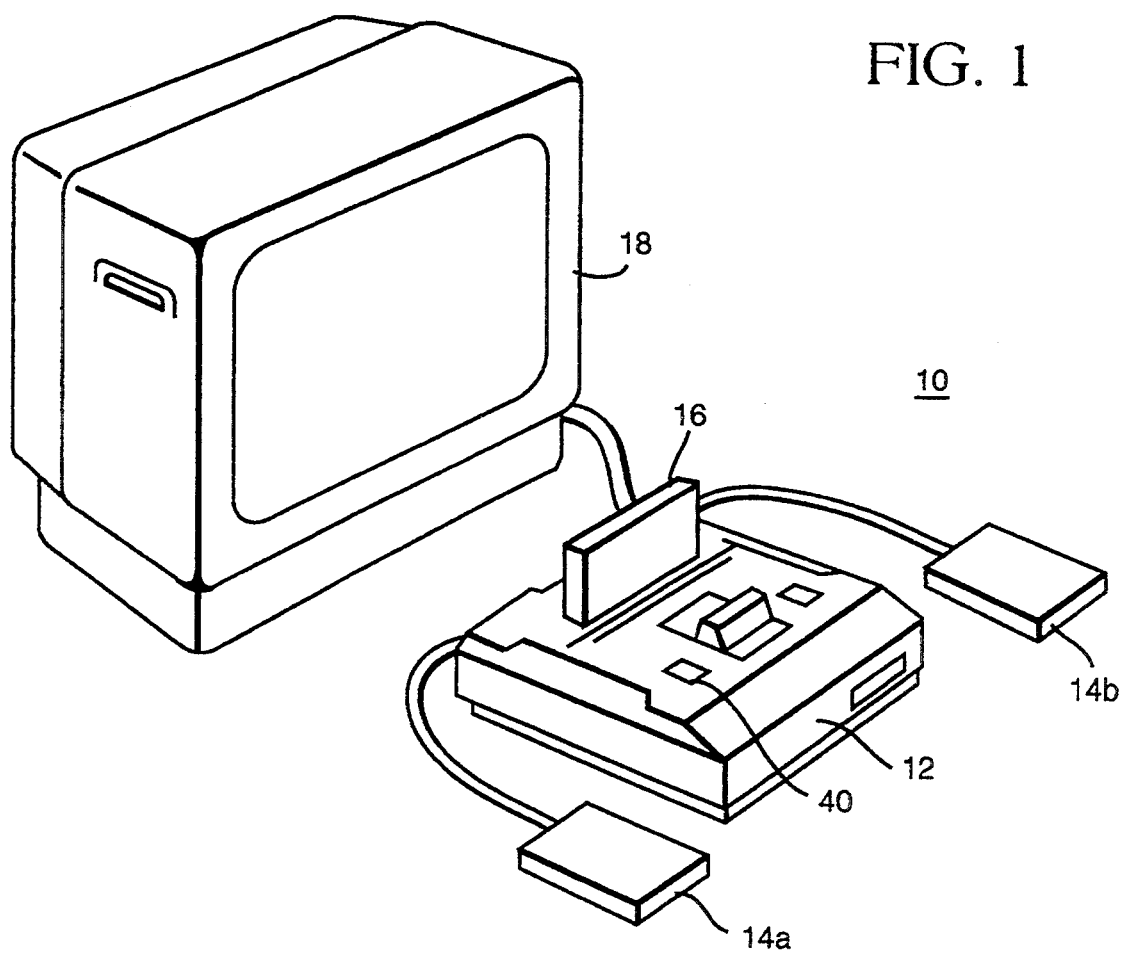
FIG. 1 is a perspective view showing one example of a video game machine as one embodiment of an information processing apparatus in accordance with the present invention.

FIG. 1 is a perspective view showing one example of a game machine as one embodiment of the information processing apparatus in accordance with the present invention. Hereinafter, a description of the present invention is made with reference to the game machine shown in FIG. 1. However, it is noted that the present invention is applicable to a variety of information processing apparatus such as a computer, word processor, banking system or the like which employs an external memory, for example, in the form of a cartridge, floppy disk, card or the like.

A game machine 10 comprises a main processor unit 12, and user controllers 14a and 14b are connected to this main unit 12. A cartridge 16 is loaded into the main unit 12 as an external memory. As described in detail later, the cartridge 16 includes a ROM (Read Only Memory) storing a program written for the game machine. The main unit 12 develops a video signal for the game in response to signals from the controllers 14a and 14b and according to the program contained in the ROM of cartridge 16, and sends this video signal to a television 18. The user watches the picture on the screen of the television 18, operates the controllers 14a and 14b as required, and thereby executes the game programmed in the ROM cartridge 16.

Figure 2:
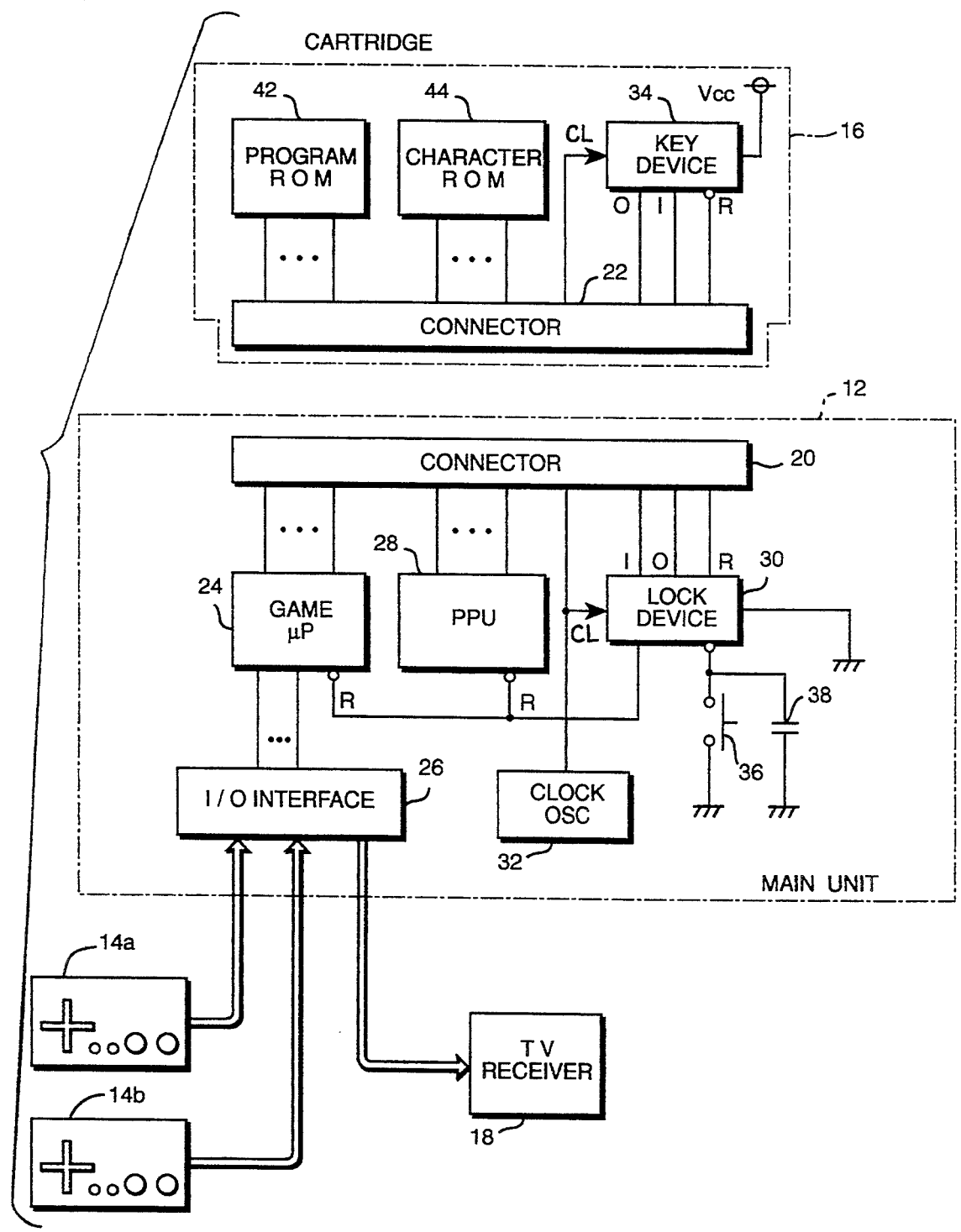
FIG. 2 is a block diagram showing a circuit configuration of this embodiment.

In reference to FIG. 2, a connector 20 is installed in the game machine main unit 12, and this connector 20 is engaged with a connector 22 of the cartridge 16, and thereby the main unit 12 is connected electrically to the ROM contained in cartridge 16.

A game microprocessor 24, for example, the integrated circuit "Z80A" manufactured by Zilog, is mounted on a printed circuit board (not shown) contained in the main unit 12, and the above-described controllers 14a and 14b and TV 18 are connected to this microprocessor 24 through an interface 26.

A PPU (picture processing unit) 28, an active semiconductor device 30 (lock) for determining the authenticity of the external ROM cartridge 16, and a clock oscillator 32 are further included in the main unit 12. The PPU 28 is composed, for example, of an integrated circuit "2CO3" manufactured by Nintendo Co. Ltd, Kyoto, Japan, the assignee of the present application, for outputting a video information signal processed by the game microprocessor 24 as a television signal for the TV 18.

The semiconductor device 30 (lock) is in this embodiment provided by a 4-bit microprocessor, for example, the integrated circuit "1ONES" manufactured by Nintendo. A like semiconductor device 34 (key) is mounted on a support structure, such as the printed circuit board (not shown), of the cartridge 16. A reset switch 36 is connected to the reset terminal R of the semiconductor device 30 (lock). A reset capacitor 38 is further connected to the reset terminal in parallel with the reset switch 36. The reset capacitor 38 is charged when a power switch 40 (FIG. 1) is turned on, thereby performing a so-called initial reset (power-on-clear) which keeps the semiconductor device 30 in the reset state for a predetermined time.

A ROM 42 for storing the game program (software) and a ROM 44 for generating data defining characters for the game video are mounted on the printed circuit board of the cartridge 16. This printed circuit board of the cartridge 16 is connected electrically to the printed circuit board of the main unit 12 through the two connectors 20 and 22 as described above.

A clock signal CL from the clock oscillator 32 is applied to semiconductor device 30 (lock) and also to the semiconductor device 34 (key) through connectors 20 and 22.

As shown in FIG. 2, a predetermined terminal of the semiconductor device 30 is grounded, while a predetermined terminal of the semiconductor device 34 is connected to a power source Vcc. Thereby, these two semiconductor devices 34 and 30 are differently conditioned to assume the role of a key or a lock, respectively.

In order that the two semiconductor devices 30 and 34 exchange data with each other, the respectively corresponding terminals I, O and R are connected to each other through the connectors 20 and 22. Also, as described above, the common clock C1 is applied to these two semiconductor devices 30 and 34 from the clock oscillator 32. Accordingly, the two semiconductor devices 30 and 34 are operated so that the respective periods and phases of operation are synchronized completely with each other.

Figure 3:
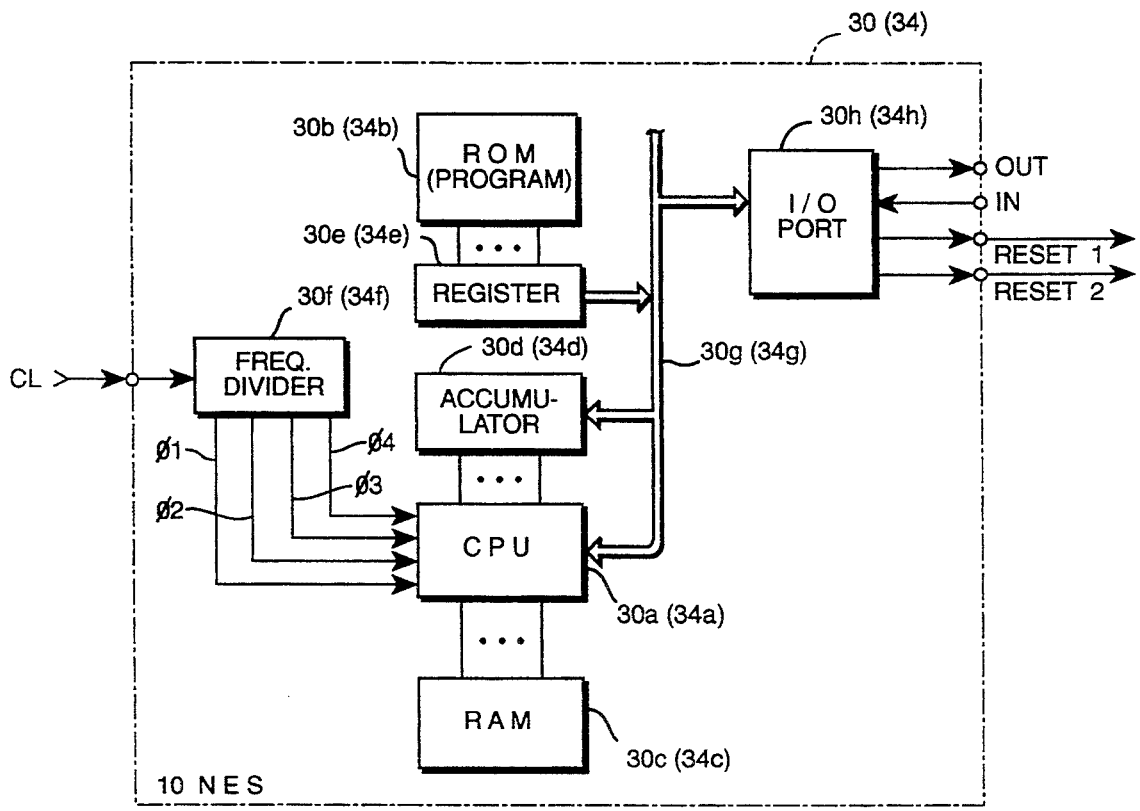
FIG. 3 is a block diagram showing a circuit configuration of a lock device used in the systems of FIGS. 1 and 2.

Further detailed description is now made of the semiconductor device 30 in reference to FIG. 3. The semiconductor device 34 in the cartridge 16 has the same construction as device 30, and therefore corresponding numbers are shown in parenthesis to avoid duplicate description.

As described above, the semiconductor devices 30 and 34 determined whether the cartridge 16 is authentic or not. The functions of these two semiconductor devices 30 and 34 can be compared to the relationship between a lock and a key. Accordingly, in the following description, the semiconductor device 30 is called a lock device and the semiconductor device 34 is called a key device.

In reference to FIG. 3, the lock device 30 is composed, for example, of a 4-bit microprocessor, comprising a CPU 30a as a data processing means and a ROM 30b and RAM 30c as semiconductor memories. The ROM 30b stores an operating program for the CPU 30a, and two arithmetic routines are contained in this operating program. Thus, a plurality of formulas and data of random numbers for arithmetic computation according to such formulas are contained in one operating program. The operating program also includes a program routine for comparing the computation result of the lock device 30 with the result computed by the key device 34 and vice versa, and for determining whether the results agree. The CPU 30a of lock device 30 functions as a determining means when these comparison and determination routines are executed.

Furthermore, a control program routine for controlling reset or release of reset of the main unit 12 based on the results of the comparison and determination program routines is contained in the operating program.

An accumulator 30d is connected to the CPU 30a. A register 30e is connected to the ROM 30b. This register 30e is for temporarily storing the program data accessed from the ROM 30b. Furthermore, a frequency divider 30f for receiving the clock signal CL from the clock oscillator 32 (FIG. 2) and dividing the frequency thereof is installed in the lock device 30, and the ratio of frequency division of the frequency divider 30f is set, for example, to $\frac{1}{4}$. The CPU 30a executes sequential program steps in response to signals of respective phases $\phi 1$, $\phi 2$, $\phi 3$ and $\phi 4$ from the frequency divider 30f.

The CPU 30a, the accumulator 30d and the register 30e are connected by a data bus 30g. This data bus 30g is connected to an I/O port 30h, data is outputted from the I/O port 30h to the key device 34, and data from the key device 34 is received through the I/O port 30h. Furthermore, two reset signals RESET 1 and RESET 2 are outputted from the I/O port 30h. The reset signal RESET 1 is given to the key device 34 to reset it. The reset signal RESET 2 is given to the game microprocessor 24 and the PPU 28 which are contained in the main unit 12 to reset them. In order to release the reset states of the key device 34 and the main unit 12, these reset signals RESET 1 and RESET 2 have only to assume the opposite (inverse) state.

Figure 4:
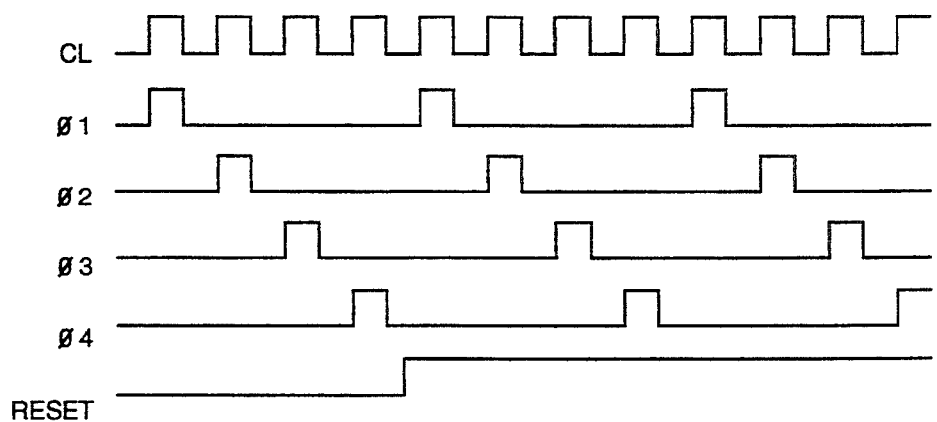
FIG. 4 is a timing chart for explaining operation of FIG. 3 device.

Next, a brief description is made on operation of the frequency divider 30f in reference to FIG. 4. As described above, the frequency divider 30f divides the frequency of the clock CL from the clock oscillator 32 by ¼. Accordingly, four signals $\phi1$, $\phi2$, $\phi3$ and $\phi4$ having different phases respectively are obtained from the frequency divider 30f. These signals $\phi1$–$\phi4$ are given to the CPU 30a. The CPU 30a performs operations in sequence in synchronism with these four signals $\phi1$–$\phi4$. For example, data from the I/O port 30h is read in synchronism with the signal $\phi1$, and predetermined arithmetic operations (data processing) are performed in response to the signals $\phi2$ and $\phi3$. Then, data from the I/O port 30h is outputted by the final signal $\phi4$.

Meanwhile, these signals $\phi1$–$\phi4$ are given also to the key device 34, and accordingly, the lock device 30 and the key device 34 are operated in complete synchronism with each other. Specifically, the lock device 30 and the key device 34 have the same number of steps in their operating programs and have the same architecture, including the same hardware and the same clock, and therefore the respective processing cycles coincide completely.

Figure 5:
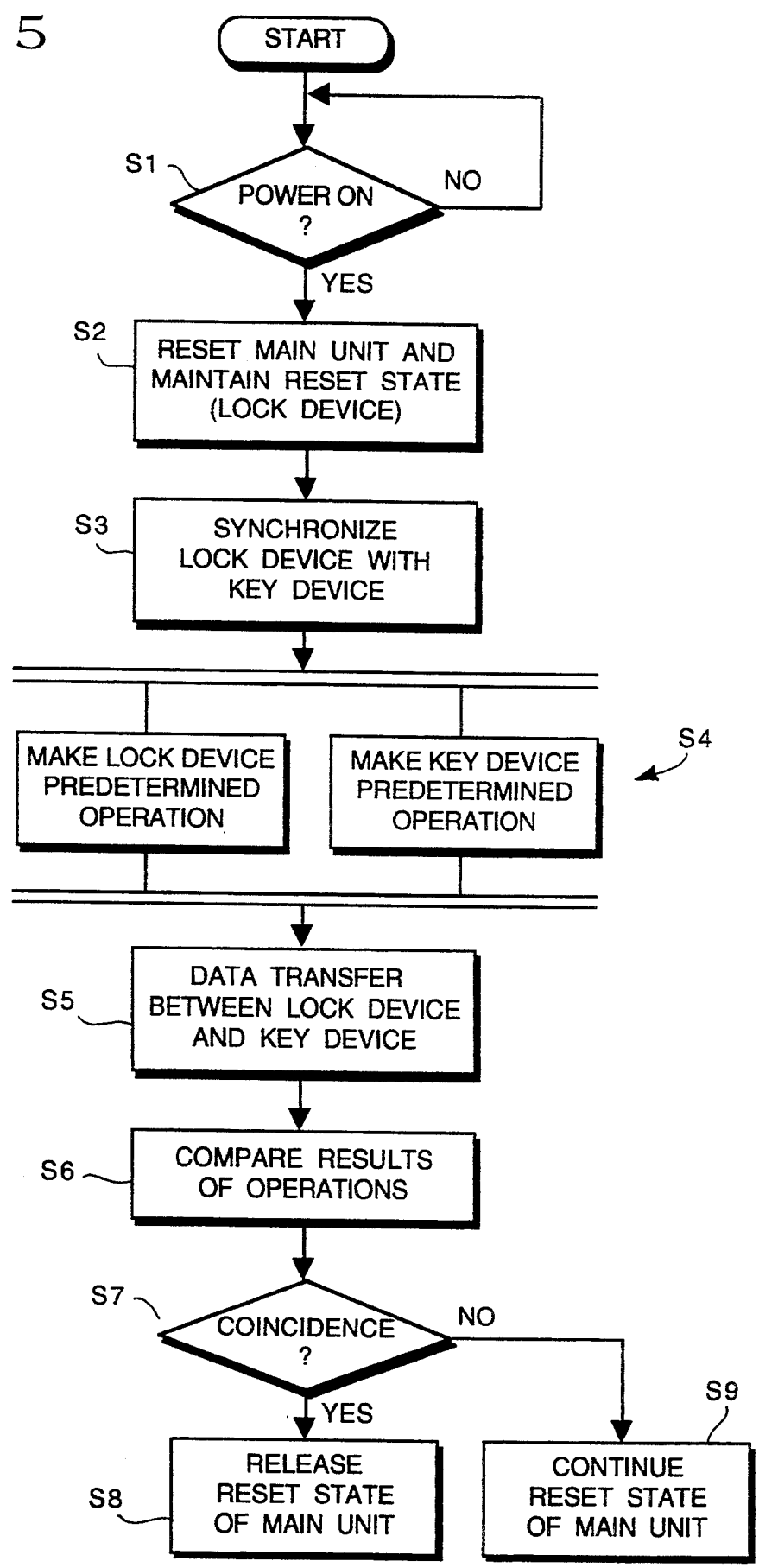
FIG. 5 is a flow chart for explaining the basic operation of the embodiment shown in FIG. 2.
Figure 6A:
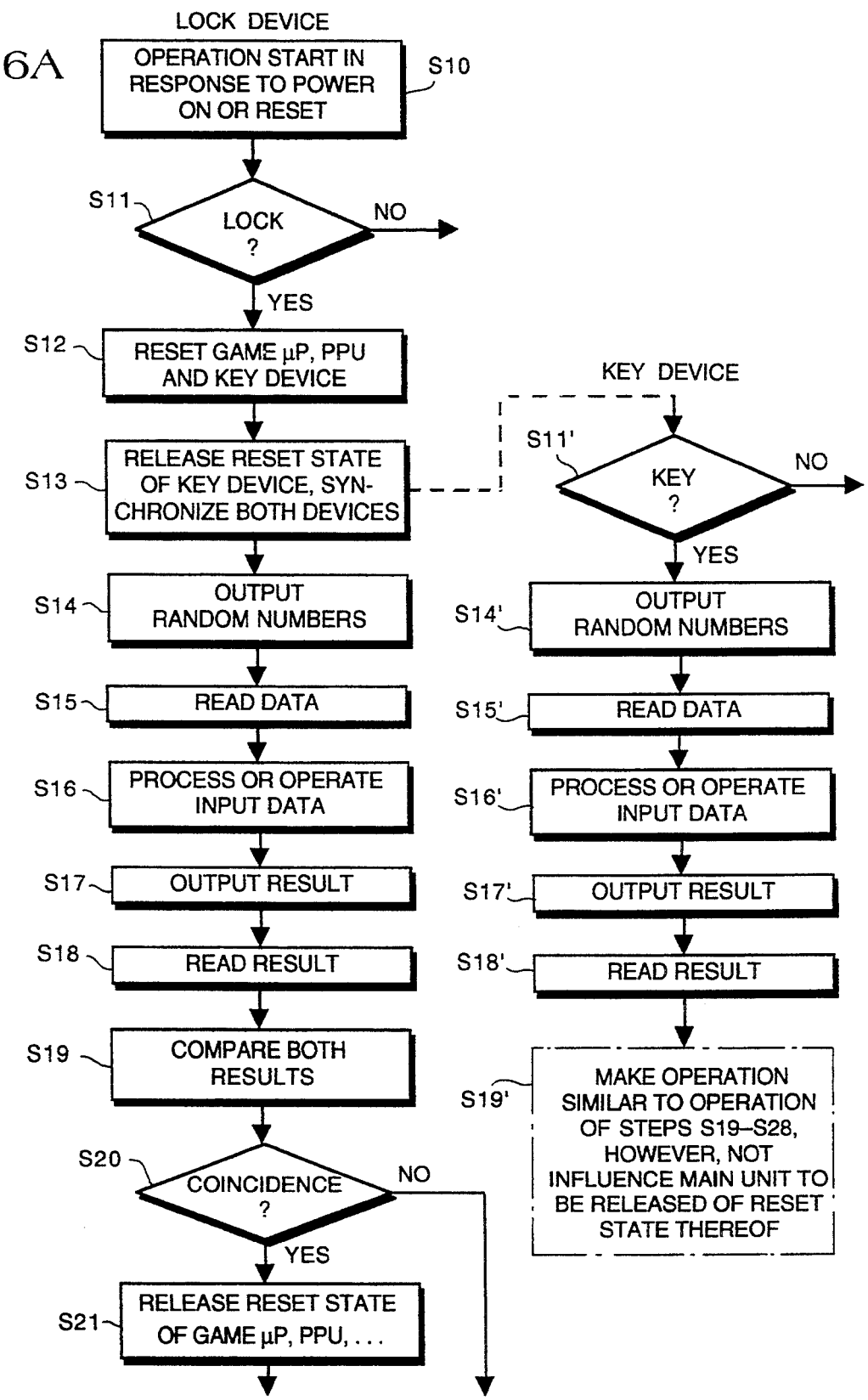
Figure 6B:
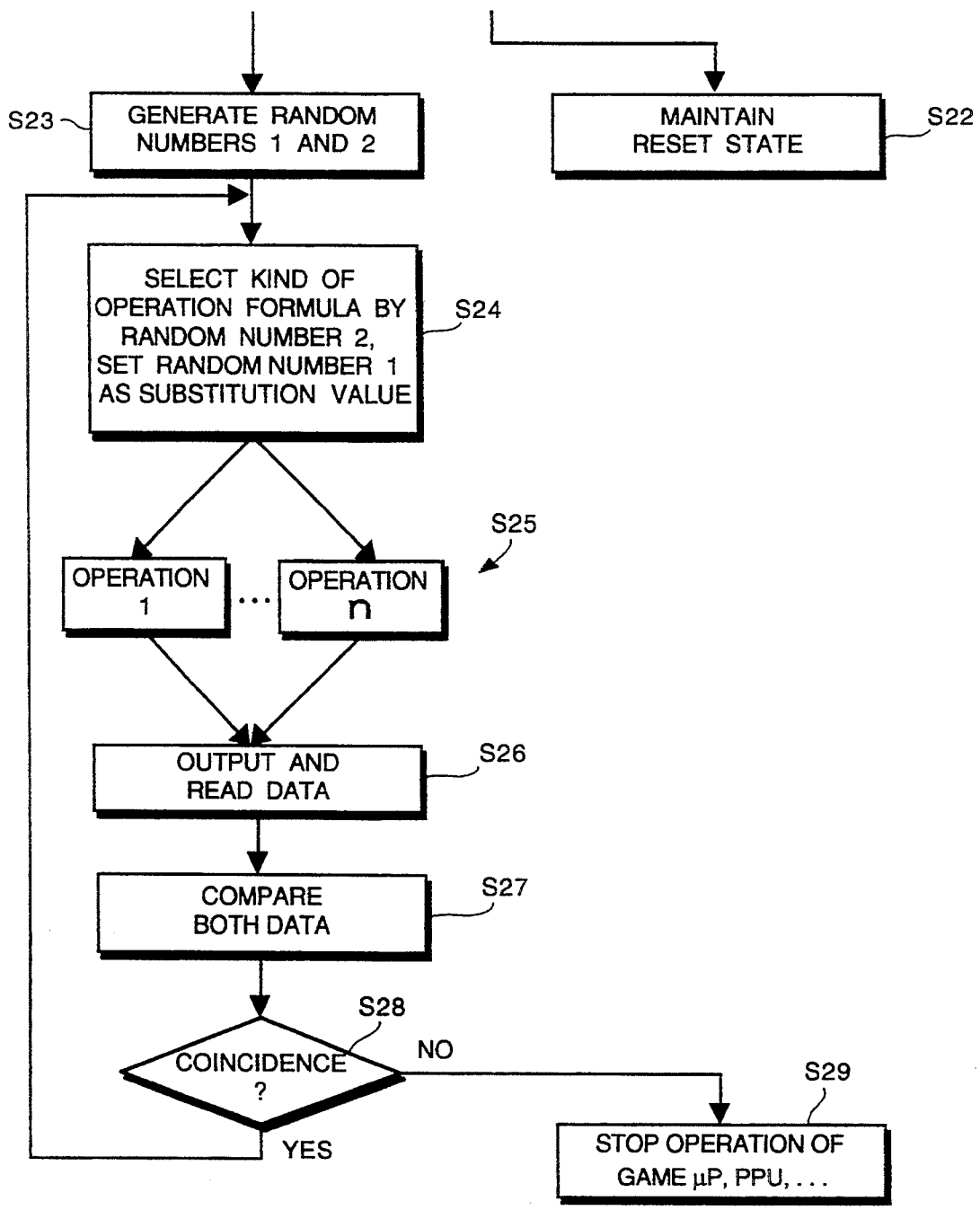
Figure 7A:
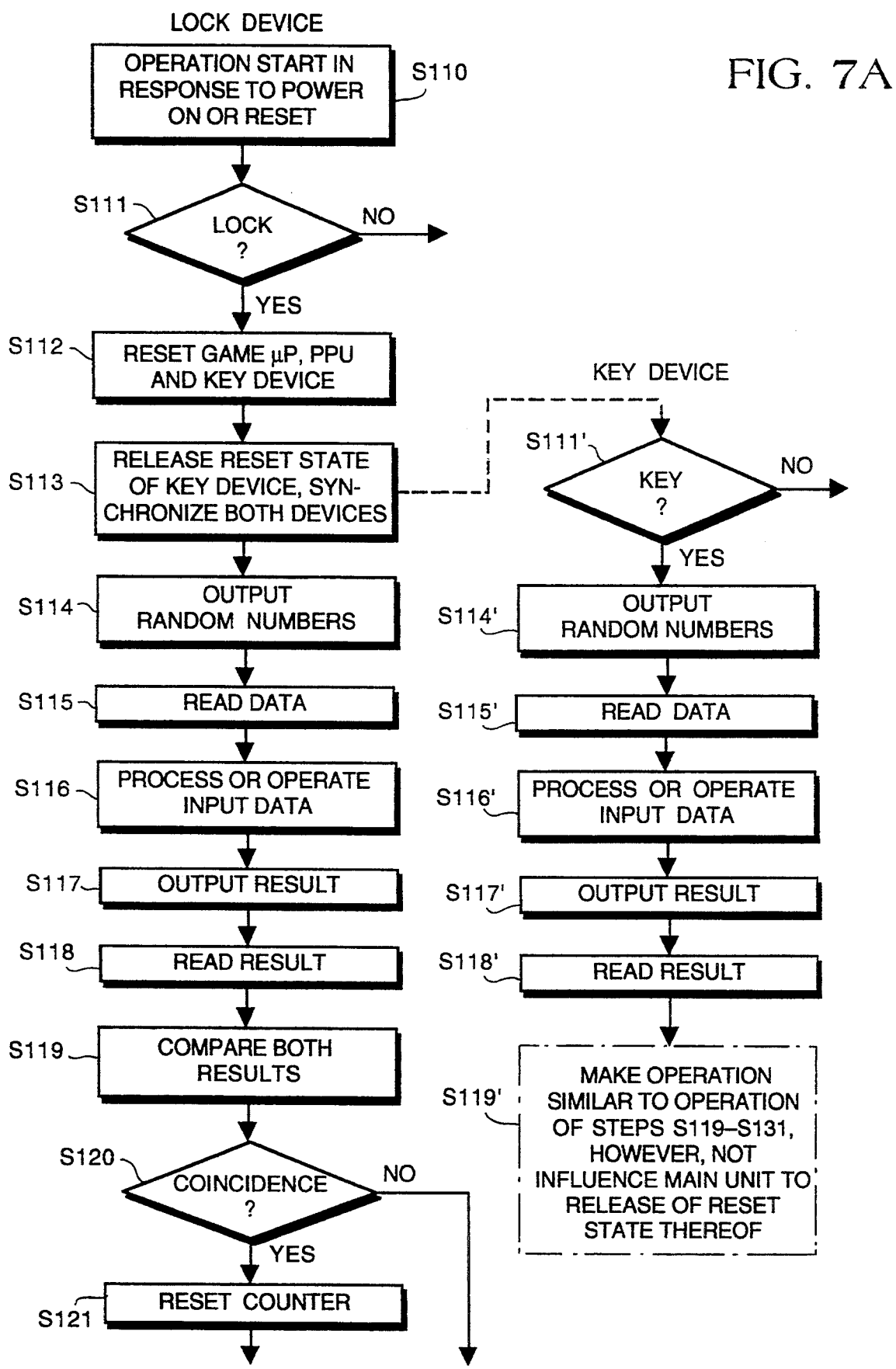
Figure 7B:
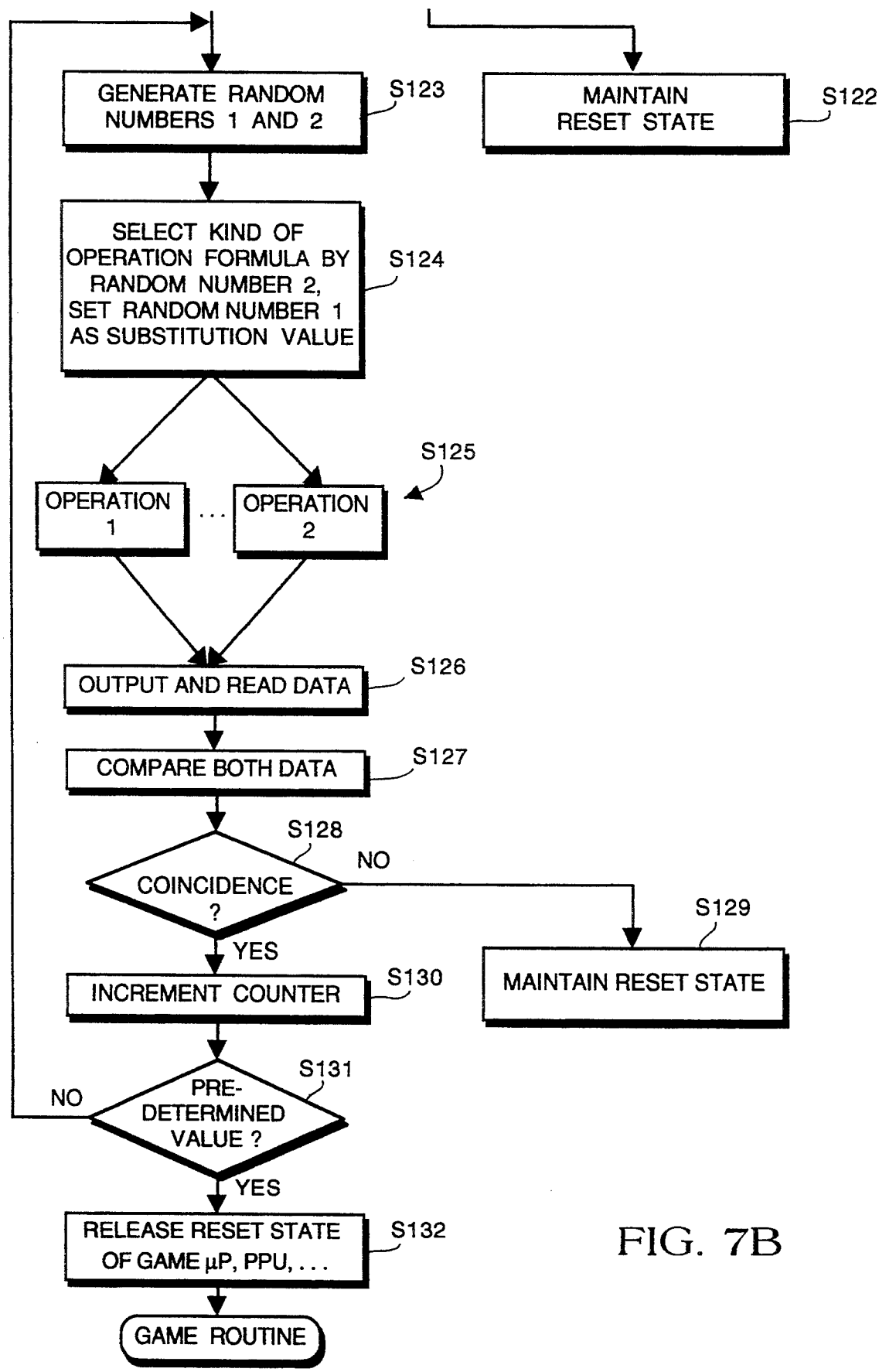

Next, a brief description is made of the operation of the embodiment with reference to FIG. 5. Afterwards, a more detailed description of the operation is made with reference to FIG. 6.

First, the cartridge 16 is loaded into the main unit 12, and the power switch 40 (FIG. 1) of the main unit 12 is turned on to start the operation (step S1). In the following step S2, the lock device 30 outputs the reset signal RESET 2 and resets the game microprocessor 24 and the PPU 38 comprised in the main unit 12, holding this state. Thus, no game can be played when the main unit 12 is reset.

Next, in step S3, the lock device 30 is synchronized with the key device 34. A method of synchronization thereof is described in reference to FIG. 4. The machine cycle of the lock device 30 is set so that the reset signal RESET 1 given to the key device 34 from the lock device 30 is outputted between signal $\phi4$ of certain period of the clock CL and the signal $\phi1$ of the next period. Consequently, the signal $\phi1$ is first inputted without fail to the key device 34. Consequently, the key device 34 can start operation from the same machine cycle $\phi1$ as that of the lock device 30. Thus, in step S3 the lock device 30 is synchronized with the key device 34, and thereafter the respective devices 30 and 34 execute predetermined operations in complete synchronization.

Next, in step S4, predetermined arithmetic operations are performed respectively by the lock device 30 and the key device 34. At this time, the arithmetic operation performed by the lock device 30 and the arithmetic operation performed by the key device 34 are the same. Accordingly, if the cartridge 16 is authentic, the results of the two arithmetic operations performed in this step S4 will be the same.

In step S5, the above-described results of the operations are transferred mutually between the lock device 30 and the key device 34. Then, in step S6, the lock device 30 and the key device 34 compare these two arithmetic operation results respectively. In step S7, if it is determined that these two results coincide (agree, then) in step S8, the lock device 30 releases the reset signals RESET 1 and RESET 2, releasing the reset states of the key device 34 and the main unit 12.

Conversely, in step S7, if it is determined that the results do not coincide, then in step S9, the lock device 30 continues to output the reset signals RESET 1 and RESET 2, and accordingly, the reset states of the key device 34 and the main unit 12 are continued. The operator cannot play the game in this reset state.

Figure 6:
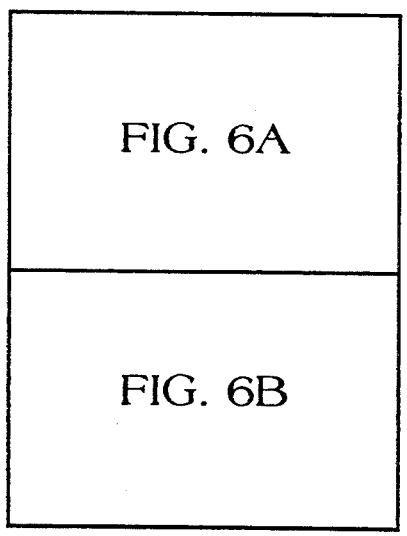
FIGS. 6, 6A, B are flow charts for explaining operation of FIG. 2 in further detail.

Next, further detailed description of the operation is made with reference to FIG. 6. In reference to FIG. 6, if the cartridge 15 is loaded into the main unit 12 and the power switch 40 (FIG. 1) of the main unit 12 is turned on or the reset switch 36 is turned on, the resetting operation of the lock device 30 is performed, and this lock device 30 starts its operating sequence at step S10.

In the following step S11, the lock device 30 determines whether it functions as the lock or as the key. As explained in FIG. 2, this determination is performed by detecting whether the predetermined terminal is grounded or connected to the power source Vcc. In this case, the lock device 30 is determined to function as the lock, but in the case where the determination indicates a key function, for example, due to wiring error, malfunction or the like, an unstable state takes place and no operations are performed at all.

In step S11, when "YES" is determined, in step S12, the lock device 30 outputs the reset signal RESET 2 so that the main unit 12 cannot execute the game program, and the reset state of the main unit 12 is continued. The game microprocessor 24 and the PPU 28 (FIG. 2) are forced to the reset state and disabled until the reset is released in the later-described step S21. And, in this step S12, the reset signal RESET 1 is also outputted to reset the key device 34.

In the next step S13, the lock device 30 releases the reset state of the key device 34, and synchronizes the two devices 30 and 34 with each other as in the above-described step S3 (FIG. 5). Thereby, the two devices 30 and 34 are synchronized with each other, and thereafter the respective devices execute sequential program steps in complete synchronism.

When the reset state of the key device 34 is released in step S13, the key device 34 determines whether it functions as the lock or as the key in the next step S11'. The determination in this step S11' can be made by detecting whether the predetermined terminal of the key device 34 is grounded or connected to the power source Vcc as in the above-described step S11', an unstable state takes place and no operations are performed at all.

When "YES" is determined in step S11', then the operations in the following step S14' and the steps thereafter are executed.

On the other hand, in the lock device 30, the operations in step S14 and thereafter are executed after the step S13 is executed. Accordingly, in the lock-device 30 and the key device 34, the very same operations are performed in synchronism, that is, in coincidence as a function of time.

First, the lock device 30 and the key device 34 output data representing random numbers from the respective program ROMs 30b and 34b (FIG. 3) in step S14 and in step S14'. Output of these random number data is performed using the very same random function. Also, the conditions determining operation of the random function are the same for the two devices 30 and 34. Accordingly, when the cartridge is authentic, the data of random numbers generated in the lock device 30 and the data of random numbers generated in the key device 34 should be the same.

Next, in steps S15 and S15', the lock device 30 and the key device 34 exchange data with each other, and read the data of random numbers generated by the counterpart, respectively. Then, in steps S16 and S16', the devices 30 and 34 perform the predetermined data processes or arithmetic operations based on the data of random numbers inputted from the counterpart. The arithmetic operations formula used for the first arithmetic operation in these steps S16 and S16' is the same in the two devices 30 and 34, and therefore the results of these operations become the same when the inputted data of random numbers are the same. Then, in steps S17 and S17', the lock devices 30 and the key device 34 output the results of arithmetic operations to the counterpart, respectively. Responsively, in steps S18 and S18', the two devices 30 and 34 mutually receive the results of arithmetic Operation outputted from the counterpart. In this case, the lock device 30 and the key device 34 perform the same operation at the same timing, and therefore the results of operation from the counterpart are received at the same timing. Accordingly, in this embodiment, both coincidence of the results of arithmetic operations and coincidence of time that results are received are taken into account to determine authenticity of the cartridge.

Next, in step S19, the lock device 30 compares the result of its arithmetic operation against the result of operation produced by the key device 34, determining whether or not they coincide. As a result of this comparison, if "NO" is determined in step S20, the lock device 30 in step S22 holds the reset state of each circuit in the main unit 12, namely, the game microprocessor 24 and the PPU 28. Thereby, the main unit 12 is prevented from executing the game program.

Meanwhile, an alarm may be generated in response to a determination of non-coincidence instead of maintaining a hold of the reset states, or the processing may return to the initial state, namely, the step S11.

As a result of the comparison in step S19, if "YES" is determined in step S20, the lock device 30 releases the reset states of these circuits, namely, the game microprocessor 24 and the PPU 28 in the next step S21.

Subsequently, in step S23, the lock device 30 generates two data groups, a first and a second, of random numbers based on predetermined random function. Then, in step S24, the lock device 30 selects the kind of arithmetic operation formula using the second data of random numbers, and sets the first data of random numbers as the values to be substituted into the arithmetic operation formula. More specifically, in this embodiment, n (positive integer) kinds of arithmetic operation formulas are set in advance in the arithmetic operation program in the ROM 30b (FIG. 3), and from among these, an arithmetic operation formula is selected in response to the second data of random numbers. Subsequently, in step S25, the selected arithmetic operation is executed using the first and the second data of random numbers.

Operations in these steps S19-S25 are also performed in the same manner at the same timing in the key device 34. Then, the same random function for generating the first and the second data of random numbers as that used for the lock device 30 is also used in the case of key device 34. Also, conditions for the random function for generating the first and the second data of random numbers is the same for the lock device 30 and the key device 34 as described above. Accordingly, if the cartridge 16 is authentic, the same arithmetic operation formula is selected for the two devices 30 and 34, and the results of these arithmetic operations should be the same.

Next, in step S26, the lock device 30 passes the results of the arithmetic operation performed in step S25 to the key device 34, and also receives the results of the arithmetic operation performed by the key device 34. A similar operation is performed in the key device 34. Next, in step S27 and S28, the lock device 30 compares and checks the results of the arithmetic operation by itself against the results of the arithmetic operation received from the key device 34 and determines whether or not they agree, i.e., coincide with each other.

If the cartridge 16 loaded in the main unit 12 is not authentic, the results of the arithmetic operations do not coincide, and therefore, in this case, the lock device 30, in step S29, outputs the reset signal RESET 2, maintaining the game microprocessor 24 and the PPU 28 of the main unit 12 in the reset state to stop their operations.

On the other hand, when the lock device 30 determines that the result of the arithmetic operation by itself and the result of the arithmetic operation received from the key device 34 coincide with each other, processing returns again to step S24, and thereafter the operations in steps S24-S28 are repeated. In other words, in this embodiment, as long as the main unit 12 is operated, the second arithmetic operation program in steps S24-S28 are executed repeatedly, and when a non-coincidence of the results of the arithmetic operations occurs even once, step S29 is executed and operation of the main unit 12 is stopped.

In addition, the same operations as those in steps S26-S29 are performed in the key device 34. However, the key device 34 has no effect on resetting and releasing each circuit of the main unit 12. This is because no reset signal is outputted to the main unit 12 from the key device 34.

As for the operation of the key device 34 corresponding to step S29, since chip-select terminal is normally installed in the ROMs 42 and 44 (FIG. 2), this chip-select terminal may be disabled. When the chip-select terminal is disabled, the game microprocessor 24 and the PPU 28 of the main unit 12 cannot access these ROMs 42 and 44, and therefore continuation of the game operation becomes impossible.

Determination of authenticity of the external memory cartridge can be made only by checking the results of the first arithmetic operations in step S16 and step S16', but also in the above-described embodiment, the second arithmetic operations and determination of the results thereof in steps S24-S28 are performed repeatedly as long as the main unit 12 is operated, and therefore the determination of authenticity of the cartridge 16 can be made nearly certain. Accordingly, in the case where a cartridge containing ROMs that are non-authentic copies of the ROMs 42 and 44 in the cartridge 16 or a cartridge containing ROMs storing similar programs are used, the software protection scheme cannot be defeated unless the same hardware as provided in the key device 34 is employed. Also, by using devices such as custom ICs or the like which are difficult to obtain normally, such a protection can be made more complete.

Thus, the protection of programs (software) contained in the cartridge 16 can be made complete by installing the key device 34 for determining the authenticity of the cartridge 16 and determining how it cooperates with the lock device 30 of the main unit 12, and accordingly any copied or forged cartridge, that is, a cartridge other than an authentic one is blocked from operating in unit 12.

Figure 7:
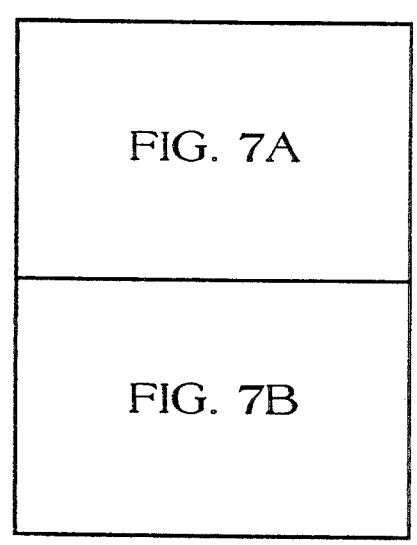
FIGS. 7, 7A, B are flow charts for explaining an alternative operation of a modified embodiment of FIG. 2.

FIG. 7 is a flow chart showing a modified example of FIG. 6. Nearly the same hardware as the embodiment in FIG. 6 is employed in this embodiment, and for this FIG. 7 embodiment, though not illustrated, a counter is formed in the RAM 30c of the lock device 30 and the RAM 34c of the key device 34 (FIG. 3), respectively. Then, by utilizing this counter, the second arithmetic operation is repeated a predetermined number of times set by this counter.

The operations in steps S110–S120 and S111'–119' of this FIG. 7 embodiment are the same as those in steps S10–S20 and S11'–S19' (in FIG. 6), and therefore duplicate description is omitted here.

If a coincidence of the results of the first arithmetic operations is determined in step S120, in FIG. 7 embodiment, the counter formed in the RAM 30c of the lock device 30 is reset in step S121. The second arithmetic operation is executed in the following steps S123–S128 likewise in steps S23–S28 in FIG. 6. Then, if a coincidence of the results of the two arithmetic operations is determined in step S128, the lock device 30 increments the counter (not illustrated) formed in the RAM 30c in the next step S130. Then, in the next step S131, determination is made of whether or not the value of the counter is the predetermined value. If the counted value of the counter does not reach the predetermined value, the lock device 30 repeats steps S123–S130.

Then, if "YES" is determined in step S131, that is, if the second arithmetic operation is repeated by the predetermined number of times, the lock device 30 releases the reset states of the game microprocessor 24 and the PPU 28 of the main unit 12 in step S132 as in step S21 in FIG. 6.

In addition, in the embodiment in FIG. 7, the second arithmetic operation is performed repeatedly by the predetermined number of times in steps S123–S131, wherein the number of times may be one.

If the results of the first arithmetic operations in steps S114–S116 coincide, the main unit 12 is enabled immediately, and thereafter the second arithmetic operation as shown in steps S123–S131 is repeated. When "NO" is determined in step S128 during the repetition, the main unit 12 is disabled, and if non-coincidence does not occur by repeating the second arithmetic operation, thereafter the main unit 12 may remain enabled until the power switch 40 (FIG. 1) of the main unit 12 is turned off.

Furthermore, steps S22 and S29 in FIG. 6 and steps S122 and S129 in FIG. 7 may be modified as follows. Black screen data for wholly blackening the screen of the television receiver 18 and title data for displaying a game title are stored in advance in the ROM 42 of the cartridge 16. Then, in the above-described step S22 or S29 and step S122 or S129, a pulse-reset signal is outputted from the lock device 30, and thereby the black screen and the title screen are displayed repeatedly in alternating fashion. Thereby the operator is informed that the cartridge 16 is not authentic.

In addition, the ROM cartridge 16 is used for an external memory in the above-described embodiment. However, for external memory, a magnetic memory, for example, floppy disk, magnetic card or an optical memory, for example, optical disk or the like may be used in place of cartridge 16.

Figure 8:
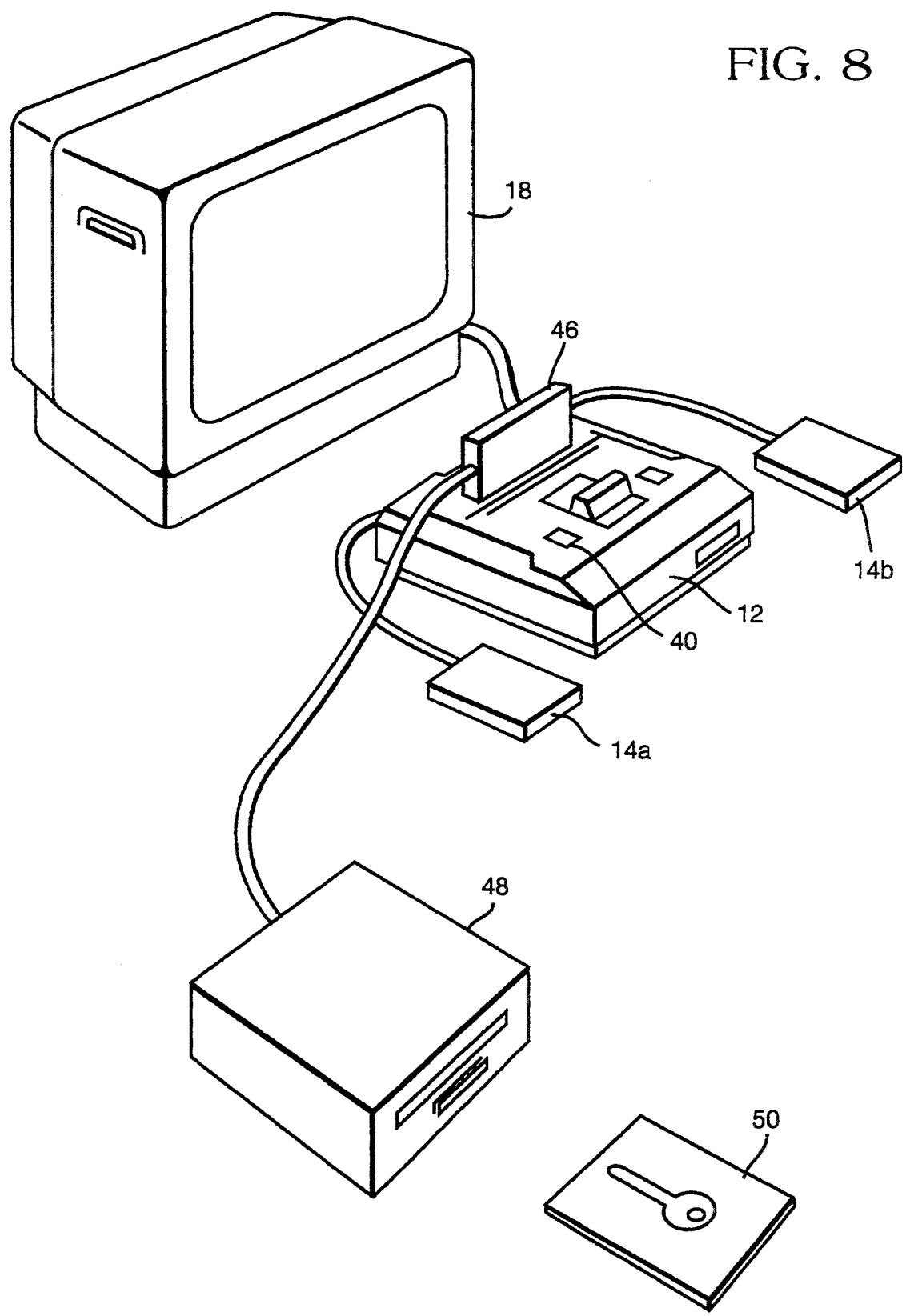
FIG. 8 is a perspective view showing another example of a video game machine as another embodiment of an information processing apparatus in accordance with the present invention.

FIG. 8 is a perspective view showing another embodiment in accordance with the present invention. This embodiment employs a floppy disk for an external memory. In the configuration of FIG. 1 embodiment, the floppy disk cannot be employed without modification, and therefore in the FIG. 8 embodiment, an adapter 46 is used which has the same shape as that of the cartridge 16 (FIG. 1) and is made attachable and detachable to the main unit 12. A disk reader 48 is connected to this adapter 46. Then, a floppy disk 50 is loaded in this reader 48. Accordingly, the program (software) written in advance to the floppy disk 50 is read by the reader 48, and it is sent to the main unit 12 through the adapter 46.

Figure 9:
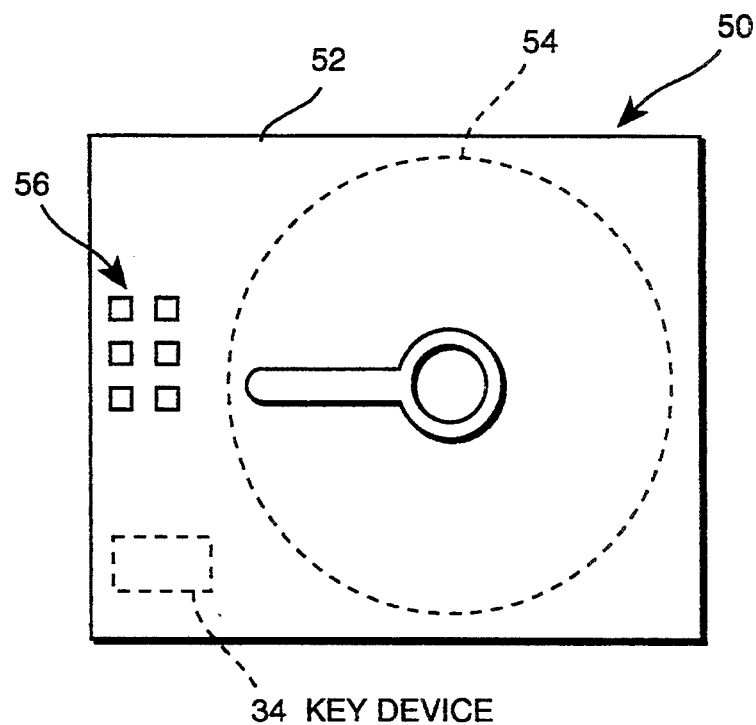
FIG. 9 is an illustrative view showing one example of a floppy disk used for the FIG. 8 embodiment.
Figure 10:
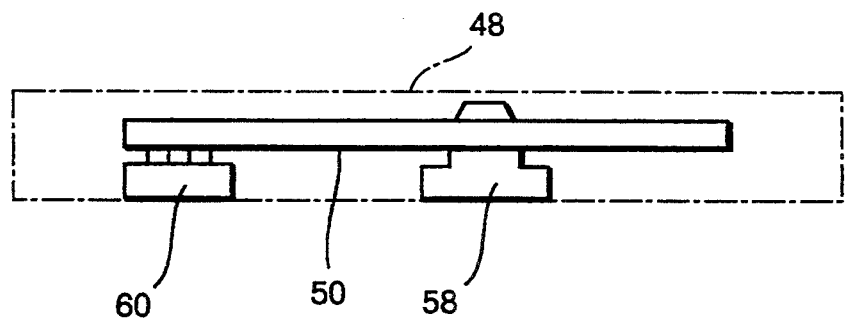
FIG. 10 is an illustrative view showing one example of an apparatus for reading data stored on the floppy disk of the FIG. 8 embodiment.

As shown in FIG. 9, the floppy disk 50 comprises a case 52 and disc-shaped magnetic sheet 54 supported rotatably in the case 52. Then, the key device 34 and an electrode 56 for connecting the key device 34 are formed in the case 52.

As shown in FIG. 9, inside the reader 48 receiving such a floppy disk 50, a disk driver 58 is accommodated and also a contact 60 connected to the electrode 56 is installed. Accordingly, the key device 34 installed in the case 52 of floppy disk 50 is connected to the lock device 30 of the main unit 12 through the electrode 56 and the contact 60.

In the embodiment in FIG. 8, operation is executed following the program as shown in FIG. 6 or 7 by cooperation of the lock device 30 (FIG. 2) comprised in the main unit 12 and the key device 34 in the floppy disk 50, and thereby determination is made whether or not the floppy disk 50 is authentic.

Meanwhile, the lock device 30 (FIG. 2) may be installed in the reader 48, not in the main unit 12. In this case, the reset signal will be given to the main unit 12 from the reader 48.

Furthermore, in the case where a memory means is comprised in the apparatus itself which is connected to the adapter 46, for example, in the case where a sound source apparatus comprising a synthesizer ROM or the like is connected, the key device 34 is installed in the adapter 46, and the operation in FIG. 6 or FIG. 7 may be executed by this key device 34 and the lock device 30 built in the main unit 12.

In addition, in the above-described embodiment, microprocessors are employed for the lock device 30 and the key device 34. However, for these devices 30 and 34, simpler digital arithmetic operation devices may be employed, and further more analog processors may be employed which perform analog processing in place of digital processing. Also, a digital circuit may be employed in either of the lock device 30 and the key device 34 and an analog circuit in the other device.

In the case where the analog circuit is employed, various configurations can be utilized other than the above-described analog processor. For example, determination of the authenticity of the external memory (software) may be performed by a coincidence of frequencies of the clock CL converted by both the lock device and the key device following the same program. Furthermore, pulse signals are outputted from the lock device 30 and the key device 34, and the duty ratio of the pulse signals is converted according to a predetermined program, and thereby authenticity can be determined by a coincidence of the duty ratios. Or, for example, determination may be made by a coincidence of levels of integrations of the same saw-tooth waves, and further deferential may be used. Or, authenticity of the external memory can be determined by determining coincidence of the results of analog processes performed by the two devices.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An external memory cartridge for replaceable connection with a video game main unit, said video game main unit being connectable to a television receiver, said video game main unit including at least one video graphics processor arrangement that at least in part controls said television receiver to display a changing picture defined at least in part by video game software contained in the external memory cartridge, said external memory cartridge comprising:
    a cartridge housing;
    at least one video game memory device disposed within said cartridge housing, said video game memory device containing said video game software;
    at least one electrical connector connected to said memory device, said electrical connector for, in use, coupling said memory device with said video game main unit to permit said video game main unit to access said video game memory device and execute said video game software; and
    a security microprocessor arrangement disposed within said cartridge housing, said security microprocessor arrangement including at least one input terminal and at least one output terminal, said input terminal and output terminal being connected to said electrical connector, said security microprocessor arrangement including a security program memory device containing a security program, said security microprocessor arrangement accessing said security program memory device and performing said stored security program, said security microprocessor arrangement, in use, receiving input signals from said electrical connector on said input terminal and generating, on said output terminal, results based at least in part on said received input signals and said stored security program.

2. An external memory cartridge as in claim 1 wherein said security microprocessor arrangement includes a reset input connected to said electrical connector, said reset input in use being controlled by said main unit to cause said security microprocessor arrangement to reset.

3. An external memory cartridge as in claim 1 wherein said main unit also includes a main unit security microprocessor arrangement operating independently from said main unit video graphics processor arrangement, and wherein said electrical connector communicates signals between said memory cartridge security microprocessor arrangement and said main unit security microprocessor arrangement.

4. An external memory cartridge as in claim 1 wherein said security microprocessor arrangement compares data received on said input terminal from said electrical connector with internally computed data.

5. External memory cartridge as in claim 1 wherein said security microprocessor arrangement has a clock input coupled to said electrical connector said clock input for, in use, receiving a clock signal provided by said main unit to said security microprocessor arrangement through said connector.

6. An external memory cartridge as in claim 1 wherein said security microprocessor arrangement includes an internal clock frequency divider.

7. An external memory cartridge as in claim 1 wherein said security microprocessor arrangement includes at least one internal data storage register.

8. An external memory cartridge as in claim 1 wherein said security microprocessor arrangement includes an accumulator for, in use, temporarily storing program data.

9. An external memory cartridge as in claim 1 wherein said security program memory device comprises a read only memory storing said security program.

10. An external memory cartridge as in claim 9 wherein said security microprocessor arrangement includes a random access memory.

11. An external memory cartridge as in claim 1 wherein said security microprocessor arrangement includes a random access memory.

12. An external memory cartridge as in claim 1 wherein said security microprocessor arrangement comprises a four-bit microprocessor.

13. An external memory cartridge as in claim 1 further including a circuit board, said security microprocessor arrangement, said memory device and said connector all being disposed on said circuit board, said circuit board being at least partially enclosed within said cartridge housing.

14. An external memory cartridge as in claim 1 wherein said security microprocessor arrangement comprises a single integrated circuit chip.

15. An external memory cartridge as in claim 1 wherein said security microprocessor arrangement includes a power input terminal connected to said electrical connector, said electrical connector, in use, connecting electrical power from said main unit to said security microprocessor arrangement power input terminal.

16. An external memory cartridge as in claim 1 wherein said security microprocessor arrangement includes a further output for, in use, generating a reset output signal.

17. An external memory cartridge as in claim 1 wherein said security microprocessor arrangement includes a CPU which, in use, executes sequences of operations at timings based on respective clock phases $\phi 1$, $\phi 2$, $\phi 3$, $\phi 4$ of a four-phase clock.

18. An external memory cartridge as in claim 1 wherein, in use, operations of said security microprocessor arrangement are synchronized with operation of said main unit.

19. An external memory cartridge as in claim 1 wherein said security microprocessor arrangement, in use, performs the following functions:
    (a) compute first results;
    (b) receive first results from said electrical connector on said input terminal;
    (c) determine whether said computed first results match said received first results;
    (d) compute second results;
    (e) receive second results from said electrical connector on said input terminal; and (f) determine whether said computed second results match said received second results.

20. An external memory cartridge as in claim 1 wherein said security microprocessor arrangement, in use, performs the following functions:
    (a) compute first results;
    (b) receive first results from said electrical connector on said input terminal;
    (c) determine whether said computed first results match said received first results;
    (d) compute further results based at least in part on previously computed results;
    (e) receive further results from said electrical connector on said input terminal;
    (f) determine whether said computed further results match said received further results; and
    (g) endlessly repeat said functions (d)-(f) as long as said changing picture continues to be displayed on said television receiver.

21. An external memory cartridge as in claim 1 wherein said security microprocessor arrangement, in use, performs the following functions:
    (a) receive data from said electrical connector on said input terminal;
    (b) compute first results based on said received data;
    (c) compute further results based at least in part on previously computed results; and
    (d) endlessly repeat said function (c) as long as said picture continues to be displayed on said television receiver.

22. An external memory cartridge as in claim 1 wherein said security microprocessor arrangement includes a further input terminal connected to said electrical connector and includes means coupled to said further input terminal for, in use, determining, based on a level applied by said electrical connector to said further input terminal, whether to operate as a lock device or as a key device.

23. An external memory cartridge as in claim 1 wherein said security microprocessor arrangement comprises a custom integrated circuit chip.

24. An external memory cartridge as in claim 1 wherein said security microprocessor includes a random access memory and said security program memory device comprises a read only memory program store.

25. An external memory cartridge as in claim 1 wherein said security microprocessor arrangement and said video game software memory device comprise different integrated circuit chips.

26. An external memory cartridge as in claim 1 wherein said security microprocessor arrangement and said video game software memory device comprise separate discrete devices.

27. An external memory cartridge as in claim 1 wherein said security microprocessor arrangement and said video game software memory device are separate from one another.

28. An external memory cartridge as in claim 1 wherein said security microprocessor arrangement and said video game software memory device, in use, operate substantially independently of one another.

29. An external memory cartridge as in claim 1 wherein said security microprocessor arrangement comprises a CPU and an associated program store, said CPU performing a predetermined sequence of operations based on instructions stored in said program store.

30. An external memory cartridge as in claim 29 wherein said predetermined sequence of operations includes at least one operation of branching depending on the value of an intermediate result.

31. An external memory cartridge as in claim 29 wherein said predetermined sequence of operations includes at least one data comparison operation.

32. A replaceable external memory cartridge for replaceable connection with a video game main unit, said video game main unit being connectable to a television receiver, said video game main unit including at least one processor arrangement that at least in part controls said television receiver to display a changing picture based on the particular video game software contained in the external memory cartridge, said external memory cartridge comprising:
    a cartridge housing;
    a circuit board disposed at least partially within said cartridge housing;
    at least one video game software memory device disposed on said circuit board, said memory device containing said particular video game software;
    at least one electrical connector connected to said memory device, said electrical connector, in use, coupling said video game software memory device with said main unit processor arrangement; and
    a security processor disposed on said circuit board and connected to said at least one electrical connector, said security processor having a security program memory device storing a security program, said security processor accessing said security program memory device and performing said stored security program, said security processor, in use, receiving input signals from said main unit through said electrical connector and providing to said main unit results through said electrical connector responsive at least in part to said received input signals and said stored security program.

33. An external memory cartridge as in claim 32 wherein said security processor is separate from said video game software memory device.

34. An external memory cartridge as in claim 32 wherein said security processor includes a microcomputer having a CPU, said security program memory device comprises a program memory storing said security program, and said security processor includes at least one input connected to said electrical connector and at least one output connected to said electrical connector.

35. An external memory cartridge comprising:
    a cartridge housing;
    a circuit board disposed at least in part within said cartridge housing;
    at least one video game software memory device disposed on said circuit board, said video game software memory device containing video game software;
    at least one electrical connector connected to said video game software memory device, said electrical connector, in use, coupling said video game software memory device to a video game main unit to permit said video game main unit to electrically access said video game software memory device and execute said video game software; and
    a security microprocessor disposed on said circuit board and connected to said electrical connector, said security microprocessor including a security program memory device containing a security program, said security microprocessor accessing said security program memory device and performing said security program, said security microprocessor, in use, receiving input signals from said main unit through said connector and providing to said main unit through said connector results responsive at least in part to said received input signals and said stored security program.

36. An external memory cartridge for replaceable connection with a video game main unit, said video game main unit being connectable to a television receiver, said video game main unit including at least one processor arrangement that at least in part controls said television receiver to display a changing picture based on video graphics software contained in the external memory cartridge, said external memory cartridge comprising:
  a cartridge housing;
  at least one video graphics software memory device disposed within said cartridge housing, said video graphics software memory device containing said video graphics software;
  at least one coupling structure connected to said video graphics software memory device, said coupling structure for, in use, coupling said video graphics software memory device with said main unit processor arrangement to permit said main unit processor arrangement to access said video graphics software memory device and execute said video graphics software contained therein; and
  a security integrated circuit chip disposed within said housing and connected to said coupling structure, said security integrated circuit chip including at least one input terminal and at least one output terminal, said security integrated circuit chip, in use, performing a predetermined sequence of data processing steps based at least in part on a control sequence internally defined within said security integrated circuit chip, said security integrated circuit chip, in use, receiving input data applied to said input terminal through said coupling structure and generating output results on said output terminal, said output results being based at least in part on (a) said received input data, and (b) said predetermined sequence of data processing steps, said output results being applied to said coupling structure.

37. A replaceable external memory cartridge for at least partial insertion into a video game main unit, said cartridge comprising:
  a cartridge housing;
  a circuit board disposed at least partially within said cartridge housing;
  at least one integrated circuit game software memory device disposed on said circuit board, said integrated circuit game software memory device containing game software;
  at least one electrical connector connected to said integrated circuit memory device, said electrical connector, in use, coupling said integrated circuit memory device to said main game unit so as to permit said video game main unit to access said game software contained within said game software memory device and play a video game base don said game software; and
  a security integrated circuit disposed within said housing, said security integrated circuit including:
    (a) a power input terminal connected to said electrical connector;
    (b) a ground terminal connected to said electrical connector;
    (c) a synchronization terminal connected to said electrical connector that, in use, synchronizes internal data processing operations of said security integrated circuit based on a synchronization signal received thereon from said video game main unit through said electrical connector;
    (d) a clock input terminal connected to said electrical connector that, in use, causes said security integrated circuit to perform a predetermined sequence of data processing steps based at least in part on a control sequence defined internally within said security integrated circuit at a timing determined by clocking signals applied thereto by said video game main unit through said electrical connector;
    (e) a data input terminal connected to said electrical connector which, in use, receives input data from said video game main unit through said electrical connector; and
    (f) a data output terminal connected to said electrical connector which, in use, provides output data to said electrical connector, said security integrated circuit, in use, computing said output data based at least in part on said received input data as processed by said predetermined sequence of data processing steps.

38. A memory cartridge comprising:
  a cartridge housing;
  a circuit board disposed at least partially within said cartridge housing;
  at least one integrated circuit video game software memory device disposed on said circuit board, said integrated circuit video game software memory device containing video game software;
  at least one electrical connector connected to said integrated circuit memory device, said electrical connector for, in use, permitting said video game software to be accessed in and read from said video game software memory device; and
  a security integrated circuit disposed within said housing, said security integrated circuit including:
    (a) a power input terminal connected to said electrical connector;
    (b) a ground terminalll connected to said electrical connector;
    (c) a synchronization terminal connected to said electrical connector that, in use, synchronizes internal data processing operations of said security integrated circuit based on a synchronization signal received thereon through said electrical connector;
    (d) a clock input terminal connected to said electrical connector that, in use, causes said security integrated circuit to perform a predetermined sequence of data processing steps based at least in part on a control sequence defined internally within said security integrated circuit at a timing determined by clocking signals applied thereto through said electrical connector;
    (e) a data input terminal connected to said electrical connector which, in use, receives input data from said electrical connector; and
    (f) a data output terminal connected to said electrical connector which in use, provides output data computed based at least in part on said received input data as processed by said predetermined sequence of data processing steps.

39. A removable external memory unit for storing a video game program to be executed, in use, by a host system, said external memory unit comprising:
program memory means for storing a video game program;
character memory means for storing data defining video game related characters;
verification processor means for operating in accordance with a verification program when said external memory unit is connected to said host system; and
connector means, coupled to said program memory means, said character memory means, and said verification processor means, for electrically connecting, in use, said external memory unit to said host system;
said verification processor means including:
verification program memory means for storing said verification program,
input means for receiving data, when connected in use to said host system, via said connector means,
output means for transferring data related to the results of the execution of said verification program, when connected in use to said host system, via said connector means,
synchronizing input means for receiving, in use, a synchronization signal via said connector means, and
processing means, responsive to said synchronization signal, for executing said verification program, said processing means including means operable to receive a host system generated value from said input means, means for performing predetermined processing operations on said host system generated value to generate results, and means for transferring at least some of said results of said predetermined processing operations to said output means.

40. An external memory unit according to claim 39, wherein said processing means receives further values via said input means from said host system and further includes means for comparing said results with said further values.

41. An external memory unit according to claim 40, wherein said processing means further includes means, responsive to the detection of coincidence between said results and said further values for performing at least a further arithmetic operation.

42. An external memory unit according to claim 41, wherein said processing means includes means for performing said further arithmetic operations and for outputting a further result.

43. An external memory unit according to claim 41, wherein said processing means further includes means for repetitively performing further arithmetic operations.

44. An external memory unit according to claim 43, wherein said means for repetitively performing further arithmetic operations executes, in use, further arithmetic operations during video game program execution.

45. An external memory unit in accordance with claim 39, wherein said verification processor means includes clock signal input means, coupled to said connector means, for receiving, in use, clock signals from said host system.

46. An external memory according to claim 45, wherein said processor means includes means responsive to said clock signals for generating a plurality of timing signals each of which initiates the performance of a predetermined processing operation.

47. An external memory unit according to claim 45, wherein said verification processor means includes means responsive to said plurality of timing signals for receiving data from said host system in response to a first timing signal, for performing predetermined arithmetic operations in response to a second timing signal and for transferring data to said host system in response to a third timing signal.

48. A video game program cartridge comprising:
an electrical interface connector having plural electrical contacts;
a first digital memory device storing a video game program;
a second digital memory device storing videographics data related to said video game program;
a microcomputer authenticating device having a microprocessor CPU, a read-only memory ROM and read/write storage RAM components, said ROM having stored therein a program for said microcomputer;
said first and second memory devices having electrical connections to a first subset of said connector electrical contacts;
said microcomputer having electrical connections to a second subset of said connector electrical contacts, said second subset being different from said first subset;
said microprocessor CPU having data communication paths only with other components of said authenticating device and said second subset of connector electrical contacts.

49. A video game cartridge according to claim 48, wherein said video game program is executed, in use, by a host system when said electrical interface connector is coupled to said host system, and wherein said program for said microcomputer is a verification program,
said microcomputer authenticating device further including:
an input port for receiving data, when connected in use to said host system, via said second subset of connector electrical contacts of said electrical interface connector, and
an output port for transferring data related to the results of the execution of said verification program, when connected in use to said host system, via said second subset of connector electrical contacts of said electrical interface connector.

50. A video game cartridge according to claim 48, wherein said microcomputer authenticating device further includes a synchronizing input port for receiving, in use, a synchronization signal via said second subset of connector electrical contacts of said electrical interface connector, and
wherein said microcomputer authenticating device is responsive to said synchronization signal, to execute said verification program, said microcomputer is operable to receive a host system generated value from said input port to perform predetermined processing operations on said host system generated value to generate results, and to transfer at least some of said results of said predetermined processing operations to said output port.

51. A video game cartridge according to claim 50, wherein said microcomputer device receives further values via said input port from said host system and further includes means for comparing said results with said further values.

52. A video game cartridge according to claim 51, wherein said microcomputer device further included means, responsive to the detection of coincidence between said results and said further values for performing at least a further arithmetic operation.

53. An video game cartridge according to claim 52, wherein said microcomputer device includes means for performing said further arithmetic operations and for outputting a further result.

54. A video game cartridge according to claim 53, wherein said microcomputer device further includes means for repetitively performing further arithmetic operations.

55. An video game cartridge according to claim 54, wherein said means for repetitively performing further arithmetic operations executes, in use, further arithmetic operations during video game program execution.

56. A video game cartridge in accordance with claim 53, wherein said microcomputer device includes clock signal input means, coupled to said electrical interface connector, for receiving, in use, clock signals from said host system.

57. A video game cartridge according to claim 56, wherein said microcomputer device includes means responsive to said clock signals for generating a plurality of timing signals each of which initiates the performance of a predetermined processing operation.

58. A video game cartridge according to claim 56, wherein said microcomputer device includes means responsive to said plurality of timing signals for receiving data from said host system in response to a first timing signal, for performing predetermined arithmetic operations in response to a second timing signal and for transferring data to said host system in response to a third timing signal.

* * * * *